United States Patent Office 2,849,807
Patented Sept. 2, 1958

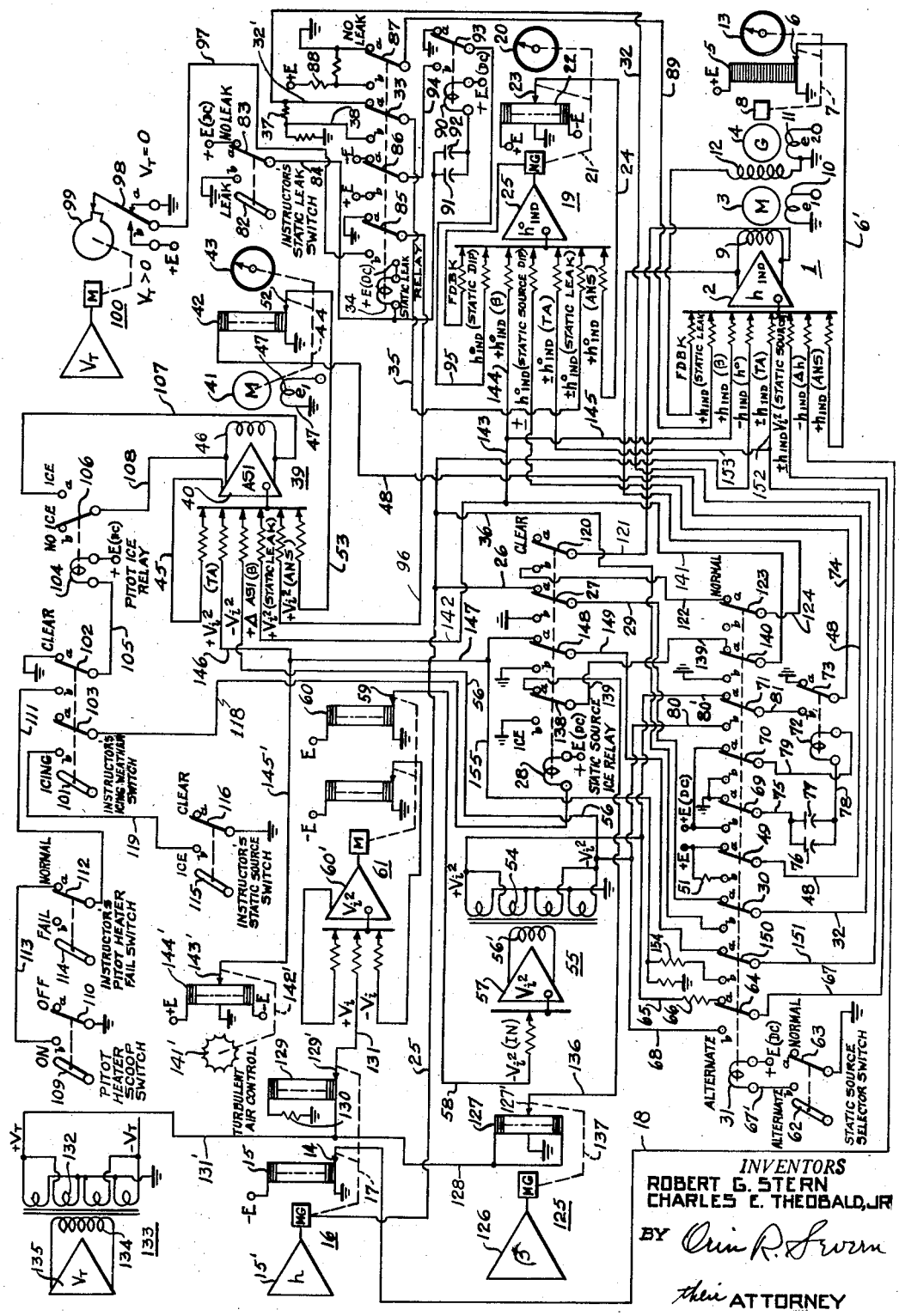

2,849,807

APPARATUS FOR SIMULATING THE STATIC SYSTEM IN AN AIRCRAFT

Robert G. Stern, West Caldwell, and Charles E. Theobald, Jr., Fairlawn, N. J., assignors to Curtiss-Wright Corporation, a corporation of Delaware Application April 22, 1955, Serial No. 503,055

24 Claims. (Cl. 35—12)

This invention relates to apparatus for simulating the static system of an aircraft, such system including devices for measuring static pressure and the flight instruments which are affected by changes in static pressure.

In certain types of aircraft as for example the DC-6B, static pressure may be measured in alternate locations. The normal static pressure source is located outside of the aircraft at the Pitot tube which is provided for ascertaining airspeed. An alternate static pressure source is however provided within the aircraft and the pilot may shift to this alternate static pressure measuring device when desired. As a result of such shifting the air speed indicator and the altimeter register a permanent higher reading whereas the rate of climb indicator registers a temporary higher reading. One instance in which the pilot may wish to shift to the alternate pressure source is when the normal static source located outside the aircraft is iced. Upon icing of the Pitot tube the air speed indicator needle is locked in place. Upon icing of the static source the altimeter needle is locked in place whereas the rate of climb indicator is caused to run-down to zero. Shifting from the normal to the alternate source under icing conditions has no effect on the air speed indicator, but causes the rate of climb indicator needle to deflect so as to reflect rate of climb once more and also causes the altimeter indicator needle to be unlocked so as to reflect altitude once more. It is proposed that apparatus be provided for simulating the described apparatus and the manner in which it functions. It is further proposed that apparatus be provided for simulating other conditions to which the static system is subject including a leak of static air which is reflected on readings of the air speed indicator, the altimeter, and the rate of climb indicator, and including turbulent air and side slip effects which also affect readings on these flight instruments.

It is a general object of our invention to provide apparatus for realistically simulating the static system of an aircraft, and a more specific object to provide such apparatus which will accurately simulate operation of a static system under various conditions as for example a leak of static air or adverse weather causing icing of the static source.

The invention will be more fully set forth in the following description referring to the accompanying drawing and the features of novelty will be pointed out with particularity in the claims annexed to and forming a part of this specification.

Referring to the drawing, the drawing is a schematic illustration showing apparatus embodying the features of our invention for simulating the static system of an aircraft. In the drawing, reference character 1 designates an altimeter servo ($h_{IND}$) which is controlled according to various input signals hereinafter referred to in detail. This servo is typical of other servo systems shown in the drawing. Referring to the altimeter servo as an example, the servo includes a servo amplifier 2 which is energized by the aforementioned input signals, a motor 3 responsive to the amplifier output, a feedback generator 4 driven by the motor 3, and a potentiometer 5 having a slider contact 6 which is connected through mechanical connection 7 to gear reduction box 8. The servo amplifier 2 is a summing amplifier for determining the resultant of the input signals and is of the type well-known in the art for algebraically summing A. C. signals of varying magnitude and polarity. A detailed circuit illustration of the servo amplifier is therefore unnecessary.

The servomotor 3 is of the two-phase type having a control phase 9 which is energized by the amplifier output and another phase 10 which is energized by a constant A. C. voltage $e_1$ de-phased 90° from the control voltage. The operation of this type of motor is well-known, rotation being in one direction when the phase difference between control and reference voltages is +90°, and in the opposite direction when the phase difference is —90°, the rate of rotation in both cases depending on the magnitude of the control voltage. The generator 4 which is driven by the servomotor is a two-phase generator having one phase 11 energized by a 90° de-phased A. C. reference voltage $e_2$, the other phase 12 generating according to the motor speed a feedback voltage for purposes of velocity control. Wherever possible the motor and generating combination has been shown only schematically and has been represented by a small rectangle enclosing the letters M. G. where a motor only is provided it has been designated merely by letter M.

Only one potentiometer resistance element 5 is shown, however in any particular servo several such resistance elements may be provided. The potentiometers shown in the drawing may be of the well-known card type and are of circular band form in practice, but are diagrammatically illustrated in plane development for clarity. A structural arrangement which may be conveniently used for a servomotor and potentiometer combination of the character above referred to is shown in Patent No. 2,341,749 issued December 2, 1947, to R. B. Grant for "Potentiometer Housing and Positioning Structure."

As stated the potentiometer card 5 is provided with a slider contact 6 and this slider contact is positioned along the card by the servomotor connecting with the contact through the gear reduction box 8 and suitable mechanical connections 7. The slider contact derives, i. e. picks off potentiometer voltages depending upon the contact position. The potentiometers for the various servos shown in the drawing are shaped or contoured as required so that the derived voltages at the potentiometer contacts bear a certain relationship to linear movement of the slider contacts depending upon the particular function of the potentiometer, and have a voltage impressed across their terminals depending as to phase and magnitude also upon the function of the potentiometer. The function of the potentiometer 5 in the altimeter servo 1 is to serve as an answer card and provide an answer signal for the servo amplifier 2. The card is energized at one end by the A. C. supply voltage +E of positive reference phase and is grounded at its other end. A voltage is derived at slider contact 6 which feeds over line 6' to provide the amplifier 2 with the answer signal +$h_{IND}$(ANS).

The altimeter servo 1 operates an instrument 13 for simulating the altimeter of the aircraft, such instrument connecting with the gear reduction box 8 of the servo through mechanical connection 7. The main input to the altimeter servo is the signal —$h_{IND}$(Δh) which is of a magnitude depending upon the position of slider contact 14 on the potentiometer card 15 in the altitude servo 16. As shown potentiometer card 15 is energized at one end by the A. C. voltage —E of negative reference phase and is grounded at its other end. The slider contact 14 is positioned on the card through mechanical connection 17 according to input signals to the servo amplifier 15' of the altitude servo ($h$), and a voltage is derived at the slider contact 14 which is fed over line 18 to provide the signal $-h_{IND}(\Delta h)$ for servo amplifier 2. Input signals to the servo amplifier 15' may be obtained as shown in the copending application of Robert G. Stern and Albert J. Sherman for a "Flight Computing System," Serial No. 463,532, filed June 14, 1954, and assigned to the same assignee as the present invention. In general by reason of the input signal $-h_{IND}(\Delta h)$ to servo amplifier 2 the altimeter servo 1 follows the altitude servo 16 to provide an altitude reading on the simulated altimeter 13. Various factors however effect the operation of the altimeter in the aircraft at one time or another and these must also be taken into account by the altimeter servo 1. Such factors are considered in detail hereinafter.

Reference character 19 designates a rate of climb servo ($\dot{h}_{IND}$) for operating the rate of climb indicator 20 which connects with the motor generator combination of the servo through mechanical connection 21. As indicated, the servo includes an answer card 22 having opposite ends energized by the positive and negative A. C. supply voltages $+E$ and $-E$ respectively, the potentiometer being grounded at the mid-point. The potentiometer card 22 includes the slider contact 23 which connects over line 24 with the servo amplifier 25 to provide an answer signal $+\dot{h}_{IND}(ANS)$. The main input to the servo amplifier 25 is the signal $\pm \dot{h}_{IND}(Static\ Leak)$. This signal is derived according to the operation of the altitude servo 16. The voltage giving rise to this signal is derived at the feedback winding of the generator of the altitude servo and may be fed over line 25', lead 26, contact 27a of the relay 28, line 29, contact 30a of the relay 31, line 32, line 32', contact 33a of the relay 34, and line 35 to the servo amplifier 25, provided relays 28 and 31 and 34 are released. In the event relay 31 is picked up, the voltage from the generator of the altitude servo may be fed over line 36 and contact 30b instead of over the lead 26, contact 27a, line 29 and contact 30a. If relay 34 is picked up, the voltage feeds over resistor 37, lead 38, and contact 33b rather than over line 32' and contact 33a. The input signal $\dot{h}_{IND}(Static\ Leak)$ accurately represents rate of climb of a simulated aircraft and is effective for operating the rate of climb servo ($\dot{h}_{IND}$) so as to cause the instrument 20 to register a rate of climb indication. Various factors effecting the rate of climb indicator in the aircraft are also taken into account by the ($\dot{h}_{IND}$) servo and these will be considered in detail in the course of the specification.

An airspeed indicator servo (ASI) designated by reference character 39 is provided including the servo amplifier 40, motor 41, potentiometer 42, and simulated airspeed indicator 43 which connects with the motor 41 by mechanical connections 44. The generator element has been eliminated in this servo and an internal feedback line 45 in the servo amplifier provided instead. As shown the motor includes the control winding 46 energized by the output of the amplifier 40 and a winding 47 energized by the 90° de-phased A. C. reference voltage $e_1$. The potentiometer card 42 is energized at one end over line 48, and either over contact 49a of the relay 31, or over contact 49b of relay 31 and resistor 51 by the A. C. voltage $+E$ depending upon whether relay 31 is released or picked up. The other end of the potentiometer 42 is grounded. A voltage is derived at the slider contact 52 of potentiometer card 42 and fed over line 53 to provide an answer signal $+V_i^2(ANS)$ to the servo amplifier 40. The main input to the servo amplifier 40 is the signal $-V_i^2$ which is supplied by means of the voltage $-V_i^2$ at the lower output terminal of the secondary winding 54 of the transformer 55, such output terminal of secondary winding 54 connecting with the servo amplifier 40 over the line 56. As shown the transformer 55 is energized by the primary winding 56' connecting with line amplifier 57 which in turn connects over line 58 with the slider contact 59 of the potentiometer 60 included in the ($V_i^2$) servo 61. The potentiometer 60 is energized at one end by the A. C. voltage $-E$ and is grounded at its other end. A voltage is derived at slider contact 59 according to the operation of the ($V_i^2$) servo to provide the aforesaid input signal ($-V_i^2$) for servo amplifier 40. In accordance with this input signal the indicator 43 is operated by the (ASI) servo to register indicated airspeed, it being noted however that other factors are also taken into account from time to time by the airspeed servo as will be hereinafter pointed out.

The apparatus is adapted to simulate the effect of switching from a normal static pressure source outside the aircraft to an alternate source located inside the aircraft. The effect of a shift from the normal to the alternate static pressure source or vice versa is to bring about changes in the altimeter and airspeed indicator readings and to produce a kick in the rate of climb indication. For the purpose of producing a changed indication in the altimeter reading upon switching from the normal to the alternate source, the servo amplifier 2 of the altimeter servo 1 is provided with an input signal $\pm h_{IND}V_i^2(Static\ Source)$ which is a function of airspeed and has a magnitude dependent upon whether the apparatus is operated to simulate reliance upon the normal or alternate static pressure source. The voltages $+V_i^2$ and $-V_i^2$ at the secondary winding 54 of transformer 55 give rise to this input signal $\pm h_{IND}V_i^2(Static\ Source)$ which is positive or negative according to whether the relay 31 is released or picked up. The relay 31 is controlled by means of static source selector switch 62 which may be operated to open or close the contacts 63a and 63b. In the normal position of the switch 62 indicating a selection of the normal static source, the contact 63b is open and contact 63a is closed. In such normal position the relay 31 is de-energized and contact 64a is closed so that the positive output voltage $+V_i^2$ of the secondary winding 54 of transformer 55 is fed over line 65, through resistor 66, over contact 64a, and line 67 to the servo amplifier 2 of the altimeter servo ($h_{IND}$) to provide a positive input signal having a pre-determined effect upon the indication of the altimeter 13. With the static source selector switch 62 in the alternate position, contact 63b is closed and the relay 31 is picked up over the circuit extending from the D. C. voltage source $+E$- (D. C.) over the relay coil, line 67', and contact 63b to ground. In this event the contact 64a is open, but the contact 64b is closed, and the output voltage $-V_i^2$ of the secondary winding 54 of transformer 55 is fed over line 68, contact 64b, and line 67 to the servo amplifier 2 to provide a negative input signal having another pre-determined effect upon the reading registered by the simulated altimeter 13 such that the reading is greater than with the static source selector switch 62 in the normal position. It is to be noted that the altimeter servo and also the rate of climb and indicated airspeed servos are so adapted that the indicators controlled thereby register higher readings as the resultant inputs become more negative and lower readings as the inputs become more positive.

The rate of climb servo 19 is provided with an input $\pm \dot{h}_{IND}(Static\ Source\ Dip)$ for taking into account a transient fluctuation in rate of climb indication which occurs in the aircraft upon shifting from the normal static pressure source to the alternate source or vice versa. Under such transient conditions this input is supplied over line 74, contact 73b of the relay 72, line 81 and either contact 71a of relay 31 and line 80' by the voltage $+V_i^2$ from the transformer secondary 54, or contact 71b of relay 31 and line 80 by the voltage $-V_i^2$ from the transformer secondary 54. The momentary introduction of the voltage $+V_i^2$ occurs upon shifting of the static source selector switch 62 from the alternate position to the normal position with the consequent deenergization of relay 31, and simulates the transient decrease in the rate of climb indication in an actual aircraft upon such switching operation. The momentary introduction of the voltage $-V_i^2$ occurs upon shifting of the static source selector switch 62 from the normal position to the alternate position with the consequent deenergization of relay 31, and simulates the transient increase in the rate of climb indication in an actual aircraft with such switching operation. The contact 73 of relay 72 under transient conditions is in the position 73b and under steady-state conditions is in the position 73a. In the latter position line 74 and therefore the input $\pm h_{IND}$(Static Source Dip) is grounded through contact 73a. In the one steady-state condition which corresponds to the static source selector switch 62 in the normal position, a pair of parallel connected capacitors 76 and 77 have their upper ends grounded through line 75 and contact 69a of the relay 31. Their lower ends are connected to the voltage $+E$(D. C.) through line 78, relay coil 72, line 79, and contact 70a of the relay 31. In the other steady-state condition which corresponds to the static source selector switch 62 in the alternate position, the upper ends of the condensers 76 and 77 are connected to the voltage $+E$(D. C.) through line 75 and contact 69b of relay 31. Their lower ends are returned to ground through line 78, relay coil 72, line 79, and contact 70b of relay 31. Thus in switching from the normal to the alternate position or vice versa the voltage across the capacitor 76 and 77 is reversed. Under either of the two steady-state conditions with the switch 62 having been in the normal or alternate position for some time, the capacitors 76 and 77 are charged to the voltage $+E$(D. C.) with one polarity or the other and no current flows through the relay coil 72, so that line 74 is grounded through contact 73a. However upon switching of the static source selector switch 62 from one position to the other a current flows through relay coil 72 to discharge the condensers 76 and 77 and then charge them to opposite polarity, which current energizes the relay 72 and causes the line 74 to be connected through contact 73b to either the voltage $+V_i^2$ or $-V_i^2$ as pointed out before with the attendant transient change in the reading of the rate of climb indicator 20. When charging of the condensers 76 and 77 to the opposite polarity is substantially complete, relay 72 is deenergized, line 74 once more is grounded through contact 73a and the indicator 20 indicates a relatively steady reading.

In addition to the change in the altimeter reading and the transient kick in the rate of climb indication occurring upon a change in the static pressure source which effects have been simulated in the manner described, the airspeed indicator is caused to register a higher reading upon changing from the normal static pressure source to the alternate source. A changed reading in the airspeed indicator upon shifting from the normal to the alternate static pressure source is effected by control of the voltage energizing the answer card 42 in the airspeed indicator servo. When the static source selector switch 62 is in the normal position such that the relay 31 is released contact 49a is closed, and the card 42 is energized by the A. C. supply voltage $+E$ over lead 50, contact 49a, and line 48, whereas with the selector switch in the alternate position and relay 31 picked up the contact 49a is open, but contact 49b is closed causing the card 42 to be energized by the voltage $+E$ acting through the resistor 51 so that the resultant input signals from the card 42 which are fed over line 53 to the airspeed indicator servo amplifier 40 are of different magnitudes for the normal and alternate positions of the switch 62. The signals cause the airspeed indicator 43 to assume a higher reading with the switch in the alternate position than when it is in the normal position.

A leak in the static system in the aircraft effects operation of the altimeter, the rate of climb indicator, and the airspeed indicator. Suitable apparatus is provided for simulating the effect of a leak in the static system and such apparatus includes the instructor's static leak switch 82 which when moved into a position for simulating a leak opens the contact 83a and closes the contact 83b to effect energization of the relay 34 over the circuit extending from the D. C. voltage source $+E$(D. C.) over the relay coil, line 84 and contact 83b to ground. The relay is de-energized with the contact 83a closed since at such time the relay coil is energized at opposite ends by like voltages $+E$(D. C.). When relay 34 picks up it opens contacts 85a, 86a, 33a, and 87a, and closes contacts 85b, 86b, 33b, and 87b. When contact 87b closes it connects the A. C. supply voltage $+E$ to the servo amplifier 2 of the altimeter servo over the resistor 88, contact 87b, and line 89 to provide input signal $+h_{IND}$(Static Leak) which signal operates the altimeter servo in such a way that the indicator 13 registers a lower reading to reflect a leak in the static system.

The closing of contact 33b changes the main input signal $\pm h_{IND}$(Static Leak) to the ($h_{IND}$) servo amplifier 25. As stated before, this input signal is derived from the generator of the altitude servo 16 and is fed over resistor 37 and line 38 with the contact 33b closed rather than over line 32' with the contact 33a closed. The rate of climb servo is positioned so that the indicator 20 reads a steady-state lower value than with the switch 82 in the normal position. The steady-state lower value is augmented by a transient fluctuation which momentarily further decreases the rate of climb indication which in an actual aircraft is also occasioned by a leak in the static system. This is simulated upon operation of the relay 90 which is energized through the condensers 91 and 92 upon closing the contact 83b. The lower ends of these condensers are returned through the relay coil to the direct voltage source $+E$(D. C.). In the normal no-leak position of switch 82, the upper ends of these condensers are connected over line 84 and contact 83a also to the direct voltage source $+E$(D. C.), so that the condensers are uncharged. With switch 82 thrown into the leak position contact 83a opens and contact 83b closes to ground the upper ends of the condensers and to charge the condensers to the voltage $+E$(D. C.). The relay 90 is energized momentarily, i. e. until the condensers are substantially charged. During the period of energization the contact 93a is open and contact 93b is closed. Closing the contact 93b connects the A. C. supply voltage $+E$ to the servo amplifier 25 over the contact 86b, line 94, contact 93b, and line 95 causing the rate of climb servo to operate the indicator 20 so as to register a further sharp dip in the rate of climb indication. However as soon as the condensers 91 and 92 are charged, relay 90 drops out opening the contact 93b and once again closing the contact 93a, thereby disconnecting the A. C. voltage $+E$ from the servo amplifier 25 and connecting the line 95 with ground. The servo is accordingly operated to cause the indicator 20 to return to a position according to the input signal $\pm h_{IND}$(Static Leak), the reading as stated being lower with the switch 82 in the "leak" position than in the "no leak" position.

Operation of the instructor's static leak switch and the subsequent energization of relay 34 has an effect upon the (ASI) servo 39 in that when the contact 85b closes, the servo amplifier 40 of the (ASI) servo is provided with an input signal $+V_i^2$(Static Leak) which is connected over line 96, contact 85b, line 97, and contact 98b with the A. C. supply voltage $+E$ which voltage is effective to operate the (ASI) servo so as to lower the reading on the airspeed indicator 43. This assumes that the computed true airspeed $V_T$ is greater than zero so that the contact 98b is closed since as indicated, cam 99 which is operated by the $V_T$ servo 100 for computing true airspeed is positioned to close contacts 98b only when the true airspeed is greater than zero, and when the true airspeed is equal to zero, the position of the cam 99 is such that contact 98b is open and contact 98a is closed. The $V_T$ servo may be controlled by input signals which are determined as disclosed in the aforementioned application of Robert G. Stern and Albert J. Sherman for "Flight Computing System" S. N. 436,532 filed June 14, 1954. With the static leak relay 34 in the normal no-leak position the input $+V_i^2$(Static Leak) is returned to ground over line 96 and contact 85a of relay 34 irrespective of the position of contact 98. With the static leak relay 34 energized and the true air speed equal to zero, the input $+V_i^2$(Static Leak) is grounded over line 96, contact 85b of relay 34, line 97 and contact 98a.

In the event icing weather is encountered by an aircraft in flight, openings in the Pitot tube for measuring impact pressure become clogged with ice, and as a result the airspeed indicator is caused to freeze in position at the reading which registers at the time of icing. The instructor's icing weather switch 101 is provided for the purpose of introducing an icing weather condition into the operation of the simulating apparatus. When this switch is positioned by an instructor in an icing weather position it opens the contacts 102a and 103a, but closes the contacts 102b and 103b. The Pitot ice relay 104 is normally energized over the circuit extending from the D. C. voltage source $+E$(D. C.) over the relay coil, line 105, and contact 102a to ground so that the relay contact 106a is open and the contact 106b closed. However opening contact 102a upon positioning the switch 101 in an icing weather position causes the relay 104 to release whereupon its contact 106a closes to short circuit the control coil 46 of the (ASI) servo over line 107, contact 106a, and line 108. By reason of the short-circuit across the motor winding 46, the servo and the simulated airspeed indicator are frozen in position. The (ASI) servo may be unfrozen by moving a simulator Pitot heater switch 109 into an "on position" opening the contact 110a and closing contact 110b to complete an energizing circuit for the relay 104 over the circuit extending from the voltage source $+E$(D. C.) over the relay coil, line 105, contact 102b, line 111, contact 112a, line 113, and contact 110b to ground, providing the instructor's Pitot heater fail switch 114 is in a normal position. A normal position for the switch 114 represents that the aircraft Pitot heater is operating properly, whereas a fail position for the switch 114 reflects a failure of the Pitot heater. In the fail position the contact 112a is open and the relay 104 is de-energized. With the contact 112a closed the relay 104 is picked up and the contact 106a is open so that the (ASI) servomotor coil is not shorted and the servo is free to operate.

Although the impact openings of the Pitot tube in the aircraft are clogged with ice the static pressure source at the Pitot tube may or may not be iced. An instructor's static source icing switch 115 is provided to reflect icing of the static source. This switch may be positioned to close the contact 116a or the contact 116b. A closed contact 116a indicates that the static source is free of ice, whereas a closed contact 116b indicates that the static source is clogged with ice. Assuming that the contact 116b is closed and the instructor's icing weather switch 101 is in the icing weather position so that contact 103b is also closed a circuit is completed for the static source ice relay 28 extending from the voltage source $+E$(D. C.) over the relay coil, line 118, contact 103b, line 119 and contact 116b to ground. The relay 28 picks up and opens the contact 120a, but closes the contact 120b to short-circuit the motor winding 9 of the altimeter servo 1 over line 121, contact 120b, line 122, contact 123a, and line 124 provided the static source selector switch 62 is in the normal position so that relay 31 is released. Shorting the motor winding 9 of the altimeter servo freezes the servo and the indicator 13 in position. The servomotor and simulated altimeter may be unfrozen by a trainee simply by moving the static source selector switch to the alternate position whereupon the relay 31 picks up to open the contact 123a and unshort the motor coil which operation additionally increases the altimeter reading, as pointed out before. Of course an instructor may unfreeze the altimeter servo by moving either the switch 101 or switch 115 to open contact 103b or contact 115b in the energizing circuit for relay 28 thereby releasing relay 28 and opening contact 120b in the short circuit of motor winding 9.

Picking up the relay 28 to simulate icing of the static source opens the contact 27a to disconnect the servo amplifier 25 of the rate of climb servo from the generator winding of the altitude servo thereby eliminating the main input signal $\pm \dot{h}_{IND}$(Static Leak) to the servo amplifier 25. The contact 27b closes connecting the input line 35 to amplifier 25 to ground over the contact 33a, line 32', line 32, contact 30a, line 29, and contact 27b assuming the static source selector switch is in the normal position and therefore relay 31 is released. The rate of climb servo and the rate of climb indicator are caused to run to zero positions. Moving the static source selector switch to the alternate position energizes relay 31 and opens contact 30a but closes contact 30b to complete a circuit over line 36 for the voltage derived at the generator of the altitude servo to the servo amplifier 25 of the rate of climb servo whereupon the rate of climb servo and the indicator 20 are caused to assume positions representing rate of climb as determined in accordance with the alternate static pressure source and independently of any simulated icing conditions. Servo and indicator resume steady-state positions and the aforementioned transient increase is superimposed.

Slide slippage of the aircraft effects readings on the altimeter, rate of climb indicator and air speed indicator and these effects are simulated. There is provided for this purpose a side slip servo ($\beta$) bearing reference character 125 and including the servo-amplifier 126 and potentiometer card 127. The servo amplifier may be controlled by signals derived in the manner shown in the copending application of Richard C. Dehmel for "Flight Computing System and Apparatus" S. N. 429,314 filed May 12, 1954, now Patent No. 2,842,867, granted on July 15, 1958. The potentiometer card 127 is grounded at its mid-point and is energized as shown at opposite ends by a voltage which is determined in accordance with the computed value of true airspeed and altitude. The potentiometer connects at opposite ends over line 128 with one end of a potentiometer 129 in the altitude servo, the potentiometer 129 having its other end grounded through resistor 130. It will be noted that a slider contact 129' on potentiometer 129 connects over line 131 with the servo amplifier 60' of the ($V_i^2$) servo to provide an input signal $+V_i$ representing indicated airspeed for operating such servo. The potentiometer 127 further connects over the line 128 and line 131' with the upper terminal of the secondary winding 132 of transformer 133 having its primary 134 energized by the output of true airspeed amplifier 135. As indicated the output of the upper terminal of the secondary winding 132 of transformer 133 is a voltage $+V_T$ which represents true airspeed. The amplifier 135 may be energized by a signal determined in the manner shown in the aforementioned copending application of Robert G. Stern and Albert J. Sherman for "Flight Computing System" S. N. 436,532 filed June 14, 1954. The side slip potentiometer 127 includes the contact 127' which is positioned through mechanical connections 137 on the card according to the operation of the side slip servo. In the absence of side-slip the contact is grounded at the mid-point. In the presence of side-slip a voltage is derived at the contact which is fed over the lead 136, contact 138a, line 139, contact 140a, line 141, and thereafter over line 142 to the (ASI) servo amplifier to provide the input signal $+ASI(\beta)$, lines 143 and 144 to the ($\dot{h}_{IND}$) servo amplifier to provide the input signal $+\dot{h}_{IND}(\beta)$, and lines 143 and 145 to the ($h_{IND}$) servo amplifier to provide the input signal $+h_{IND}(\beta)$, provided relays 28 and 31 are released. The input signals to the servo amplifiers determined according to the operation of the ($\beta$) servo result in lower readings on indicators 43, 20 and 13 according to the magnitude of side-slippage regardless of the direction, i. e. irrespective of whether contact 127' is on one side or the other of the grounded point on card 127. If either the relay 28 is energized to simulate icing of the static source or the relay 31 is energized to indicate selection of alternate static source, the servo amplifiers of the (ASI) servo, the ($\dot{h}_{IND}$) servo, and the ($h_{IND}$) servo are disconnected from the derived voltage at the slider contact 127' of the side slip servo and instead such servo amplifiers are connected to ground over contact 140b or contact 138b so that under such conditions, side slip is of no effect in the operation of indicators 43, 20 or 13. It should be recalled that the effect on the rate of climb indicator 20 of a simulated icing of the normal static source is a run-down of the indicator to register zero. The side-slip signal to the rate of climb servo is eliminated on simulated icing of the normal static source to prevent the rate of climb indicator 20 to register below zero. The readings of the altimeter indicator 13 and the air speed indicator 43 when subject to simulated icing are frozen in place with the normal static source selected, as explained before. Elimination of the side-slip signals to their respective amplifiers on icing of the normal static source has therefore no added effect on the readings. It should also be recalled that the effect of switching from the normal to the alternate static source is to clear the rate of climb indicator 20 and the altimeter indicator 13 of icing effects and to produce respectively transient and permanent increases. The elimination of the side-slip signal to their respective amplifiers upon such switching from the normal to the alternate source simulates independence of these readings of side-slip when the alternate static source is selected and results in further increases. On the other hand selecting the alternate source does not clear the air speed indicator 43 of icing effects. Therefore elimination of the side-slip signal to the ASI amplifier on switching from the normal to the alternate static source has no effect on this indicator when it is subject to icing effects. In the absence of icing effects shifting from the normal to the alternate source effects a twofold increase in the reading of indicator 43, one due to elimination of the side-slip signal and the other due to the very fact of shifting, as explained before.

For the purpose of simulating the effect which turbulent air has on the altimeter, rate of climb indicator and airspeed indicator an instructor's turbulent air control 141' is provided which may be moved by the instructor to position through mechanical connection 142' a slider contact 143' on potentiometer card 144', the potentiometer being energized at opposite ends by the positive and negative A. C. supply voltage +E and —E respectively and connected at its mid-point with ground. The slider contact 143', which is normally connected to the grounded mid-point, connects over the lines 145' and 146 with the airspeed indicator servo amplifier 40 to provide input signal $\pm V_i^2(TA)$. This signal which is determined according to the position of the control 141 results in a lower or higher reading on the airspeed indicator according to the wishes of the instructor. As shown the slider contact 143 also connects over line 145', line 147, contact 148a of relay 28, line 149, contact 150a of relay 31, line 151, and line 152 with the altimeter servo amplifier 2 to provide input signal $\pm h_{IND}(TA)$ which causes the altimeter servo to operate the altimeter 13 to a lower or higher reading so as to reflect a turbulent air condition. As shown the rate of climb servo amplifier 25 is also provided with a turbulent air signal $\pm \dot{h}_{IND}(TA)$ since the line 151 in addition to connecting with the servo amplifier 2 over line 152 also connects with the servo amplifier 25 over the line 153. By reason of such signal the rate of climb servo is operated to cause indicator 30 to register a lower or higher reading indicating a turbulent air condition. The described circuits are complete only if the relays 28 and 31 are released. If the relay 28 is picked up to simulate icing of the static source, and relay 31 is released indicating reliance on the normal static source the altimeter and rate of climb servo amplifiers are disconnected from the slider contact 143' of the turbulent air control potentiometer 144' and are instead connected to ground over contact 148b. Such disconnection has the effect of limiting the run-down of the rate of climb indicator 20 to zero, but has no further effect on the altimeter indicator 13 which is frozen in place as explained before. If the relay 31 is picked up indicating a selection of the alternate static source, the altimeter and rate of climb servos are connected with the slider contact 143' over the contact 150b, resistor 154, line 155, line 147 and line 145' regardless of whether relay 28 is picked up or released. The altimeter and rate of climb servos connect with the slider contact 143' through the resistor 154 and therefore indicators 20 and 13 register less of a turbulent air effect than with relays 28 and 31 released, and this is the situation experienced in the aircraft upon shifting from the normal to the alternate static source. It should be recalled that upon selection of the alternate static source the indicator 13 registers a permanent higher reading and the indicator 20 registers a transient higher reading. Freezing in place of the air speed indicator 43 cannot be cured by selection of the alternate static source and therefore it is unnecessary to subject the turbulent air input signal $+V_i^2(TA)$ to the action of the relays 28 and 31. With icing effects cleared, the effect of shifting to the alternate source is to cause a higher reading of indicator 43 as explained before.

It should be understood that this invention is not limited to specific details of construction and arrangement thereof herein illustrated, and that changes and modifications may occur to one skilled in the art without departing from the spirit of the invention.

What is claimed is:

1. Apparatus for simulating operation of a static pressure system of an aircraft having normal and alternate sources of static pressure, comprising means for deriving control quantities determinative of indicated altitude, rate of climb indication and indicated airspeed, computing means respectively controlled according to said control quantities determining indicated altitude, rate of climb indication and indicated airspeed, indicators controlled by said computing means to respectively register indicated altitude, rate of climb indication and indicated airspeed, means positionable to alternatively select normal and alternate static pressure sources, and means operatively connected with the static pressure source selector means and the computing means for changing the indicator readings responsive to operation of the static pressure source selector means.

2. Apparatus for simulating operation of a static pressure system of an aircraft having normal and alternate sources of static pressure, comprising means for deriving control quantities determinative of indicated altitude, computing means controlled according to said control quantities, an indicator controlled by said computing means for registering indicated altitude, means positionable to alternatively select normal and alternate static pressure sources, and means for changing the indicator reading responsive to change in position of the static pressure source selector means.

3. Apparatus for simulating operation of a static pressure system of an aircraft comprising means for deriving control quantities determinative of indicated altitude, rate of climb indication and indicated airspeed, computing means controlled according to the quantities determinative of indicated altitude, other computing means controlled according to the quantities determinative of rate of climb, and still other computing means controlled according to the quantities determinative of indicated airspeed, an indicator controlled by each of said computing means for respectively registering indicated altitude, rate of climb and indicated airspeed, an instructor's icing weather control means, means for freezing operation of said computing means controlled according to said quantities determinative of indicated airspeed upon actuation of the instructor's icing weather control means, an instructor's static source icing control means, and means for freezing operation of said computing means controlled according to said quantities determinative of indicated altitude and for causing said computing means controlled according to said quantities determinative of rate of climb indication to run to zero upon actuation of the static source icing control means.

4. Apparatus for simulating operation of a static pressure system of an aircraft comprising means for deriving control quantities determinative of indicated altitude and rate of climb, computing means controlled according to the quantities determinative of indicated altitude, other computing means controlled according to the quantities determinative of rate of climb indication, an indicator controlled by each of said computing means for respectively registering indicated altitude and rate of climb, an instructor's static source icing control means, means for freezing operation of said computing means controlled according to said quantities determinative of indicated altitude and for causing said computing means controlled according to quantities determinative of rate of climb to run to zero upon actuation of said static source icing control means.

5. Apparatus for simulating operation of a static pressure system of an aircraft comprising means for deriving control quantities determinative of indicated altitude, rate of climb indication and indicated airspeed, computing means controlled according to the quantities determinative of indicated altitude, other computing means controlled according to the quantities determinative of rate of climb indication, still other computing means controlled according to the quantities determinative of indicated airspeed, an indicator controlled by each of said computing means for respectively registering indicated altitude, rate of climb and indicated airspeed, normal and alternate static source selector means, means for rendering the operation of each of said computing means dependent upon the position of said selector means, instructor's icing weather control means, means for freezing operation of said computing means controlled according to quantities determinative of indicated airspeed, an instructor's static source icing control means, means for freezing operation of said computing means controlled according to said quantities determinative of indicated altitude and for causing said computing means controlled according to quantities determinative of rate of climb to run to zero upon actuation of said static source icing control means provided said static source selector means is positioned to correspond to a selection of normal static pressure source.

6. Apparatus for simulating operation of a static pressure system of an aircraft comprising means for deriving control quantities determinative of indicated altitude and rate of climb, computing means controlled according to the quantities determinative of indicated altitude, other computing means controlled according to the quantities determinative of rate of climb indication, an indicator controlled by each of said computing means for respectively registering indicated altitude and rate of climb, normal and alternate static source selector means, means for rendering the operation of each of said computing means dependent upon the position of said selector means, an instructor's static source icing control means, means for freezing operation of said computing means controlled according to quantities determinative of indicated altitude and for causing said computing means controlled according to quantities determinative of rate of climb to run to zero upon actuation of said static source icing control means provided said static source selector means is positioned to correspond to a selection of normal static pressure source.

7. Apparatus for simulating operation of a static pressure system of an aircraft having normal and alternate sources of static pressure, comprising means for deriving control quantities determinative of a simulated flight condition subject to ambient and dynamic air effects, computing means controlled according to said control quantities for determining said simulated flight condition, an indicator controlled by said computing means to indicate said computed condition, means positionable to alternatively select normal and alternate static pressure sources, and means responsive to operation of said static pressure source selector means for changing said indicator reading.

8. Apparatus as defined in claim 7, wherein the change in indicated reading responsive to change in position of the static pressure source selector means is a transient change.

9. Apparatus as defined in claim 7, wherein it is provided that when the static pressure source selector means is changed from the normal to the alternate position the indicator registers a transient increase and vice versa.

10. Apparatus as defined in claim 7, wherein the change in indicated reading responsive to change in position of the static pressure source selector means is a permanent change.

11. Apparatus as defined in claim 7, wherein it is provided that when the static pressure source selector means is changed from the normal to the alternate position the indicator registers a permanent increase and vice versa.

12. Apparatus as defined in claim 7 with the inclusion of instructor's icing weather control means, and means responsive to the operation of said icing weather control means for freezing in place the reading of the indicator.

13. Apparatus as defined in claim 7 with the inclusion of instructor's icing weather control means, and means responsive to the operation of said icing weather control means for freezing in place the reading of the indicator provided the static pressure source selector means is positioned to select the normal source.

14. Apparatus as defined in claim 7 with the inclusion of instructor controlled means for simulating static source icing, and means responsive to the operation of said simulated icing means for causing the indicator to run down to zero.

15. Apparatus as defined in claim 7 with the inclusion of instructor controlled means for simulating static source icing, and means responsive to the operation of said static source icing means for causing the indicator to run down to zero provided the static pressure source selector means is positioned to select the normal source.

16. Apparatus as defined in claim 7 with the inclusion of instructor controlled means for simulating a leak in the static system of the aircraft, and means responsive to operation of said leak simulating means for effecting a transient decrease in the reading of the indicator.

17. Apparatus as defined in claim 7 with the inclusion of instructor control means for simulating a leak in the static system of the aircraft, and means operatively connected to said leak simulating means for causing a permanent decrease in the reading of the indicator.

18. Apparatus as defined in claim 7 with the inclusion of instructor controlled means for simulating a leak in the static system of the aircraft, and means responsive to operation of said leak simulating means for effecting a transient and a steady-state decrease in the reading of the indicator.

19. Apparatus as defined in claim 7 with the addition of an instructor's turbulent air control, and means for effecting changes in the reading of the indicator according to the operation of said instructor's turbulent air control.

20. Apparatus as defined in claim 7 with the addition of side-slip computing means, and means for effecting changes in the reading of the indicator according to the operation of said side-slip computing means.

21. Apparatus as defined in claim 7 with the addition of side-slip computing means, means adapted to effect side-slip changes in the reading of the indicator according to the operation of side-slip computing means, and means operatively connected to said static pressure source selector means and to said side-slip changing means for alternatively producing greater and lesser changes in the reading of the indicator depending on whether said static pressure source selector means is positioned to select respectively the normal and alternate sources.

22. Apparatus for simulating operation of a static pressure system of an aircraft having normal and alternate sources of static pressure, comprising means for deriving control quantities determinative of indicated air speed, computing means controlled according to said control quantities, an indicator controlled by said computing means for registering indicated air speed, means positionable to alternatively select normal and alternate static pressure sources, and means for changing the indicator reading responsive to change in position of the static pressure source selector means.

23. Apparatus for simulating operation of a static pressure system of an aircraft having normal and alternate sources of static pressure, comprising means for deriving control quantities determinative of indicated rate of climb, computing means controlled according to said control quantities, an indicator controlled by said computing means for registering indicated rate of climb, means positionable to alternatively select normal and alternate static pressure sources, and means for changing the indicator reading responsive to change in position of the static pressure source selector means.

24. Apparatus as defined in claim 23 with the inclusion of means for reflecting true air speed alternatively as equal to zero and greater than zero, instructor controlled means for simulating a leak in the static system of the simulated aircraft, and means operatively connected to said true air speed reflecting means and leak simulating means for lowering the air speed indicator reading provided said air speed reflecting means reflects true air speed greater than zero.

References Cited in the file of this patent

UNITED STATES PATENTS

| | | |
|---|---|---|
| 2,499,597 | Lukacs | Mar. 7, 1950 |
| 2,556,964 | Giroud | June 12, 1951 |
| 2,584,261 | Davis et al. | Feb. 5, 1952 |
| 2,687,580 | Dehmel | Aug. 31, 1954 |